US009363105B2

(12) United States Patent
Hu et al.

(10) Patent No.: US 9,363,105 B2
(45) Date of Patent: Jun. 7, 2016

(54) METHOD FOR BLOCKING SPAM SHORT MESSAGES IN WIRELESS NETWORK

(75) Inventors: Grace Zhaowen Hu, Qingdao (CN); Ming Ai Chi, Qingdao (CN); Julie Jingping Bai, Qingdao (CN); Anne Tian Luan, Qingdao (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1247 days.

(21) Appl. No.: 11/479,007

(22) Filed: Jun. 30, 2006

(65) Prior Publication Data
US 2007/0249374 A1   Oct. 25, 2007

(30) Foreign Application Priority Data
Apr. 21, 2006   (CN) .......................... 2006 1 0077762

(51) Int. Cl.
H04L 12/58   (2006.01)
H04W 4/14   (2009.01)

(52) U.S. Cl.
CPC .......... *H04L 12/585* (2013.01); *H04L 12/5895* (2013.01); *H04L 51/12* (2013.01); *H04L 51/38* (2013.01); *H04W 4/14* (2013.01)

(58) Field of Classification Search
USPC ..................... 455/466, 418; 726/22
See application file for complete search history.

(56) References Cited

U.S. PATENT DOCUMENTS

| 5,903,726 | A | * | 5/1999 | Donovan et al. ............... 709/206 |
| 6,175,743 | B1 | * | 1/2001 | Alperovich et al. .......... 455/466 |
| 6,738,635 | B1 | * | 5/2004 | Lewis et al. ................... 455/466 |
| 6,751,463 | B1 | * | 6/2004 | Lorello et al. ................ 455/466 |
| 6,819,932 | B2 | * | 11/2004 | Allison et al. ................ 455/466 |
| 6,993,325 | B1 | * | 1/2006 | Waesterlid ................. 455/414.1 |
| 7,155,243 | B2 | * | 12/2006 | Baldwin et al. ............... 455/466 |
| 7,403,537 | B2 | * | 7/2008 | Allison et al. ................ 370/426 |
| 7,409,203 | B2 | * | 8/2008 | Zabawskyj et al. ........ 455/412.1 |
| 7,545,767 | B2 | * | 6/2009 | Zhao et al. ..................... 370/328 |
| RE41,411 | E | * | 6/2010 | Cobb ............................ 709/206 |
| 7,844,285 | B2 | * | 11/2010 | Lorello et al. ................ 455/466 |
| 2001/0006897 | A1 | * | 7/2001 | Kang et al. .................... 455/466 |

(Continued)

FOREIGN PATENT DOCUMENTS

WO   2005055545 A1   6/2005

OTHER PUBLICATIONS

International Search Report dated Sep. 24, 2007.

*Primary Examiner* — Kamran Afshar
*Assistant Examiner* — Farideh Madani
(74) *Attorney, Agent, or Firm* — McCormick, Paulding & Huber LLP

(57) ABSTRACT

In a method for controlling the delivery of short text messages or other messages in a wireless network, a source terminal transmits a message to a recipient wireless unit over the network's short messaging service ("SMS"). The message includes a message identifier, a communication identifier of the recipient wireless unit, and message content. Initially, it is determined whether the message satisfies a criterion for blocking the message. If so, the message is blocked. For example, transmission of the message may be blocked if the message identifier is not an authorized identifier. Alternatively, the message may be blocked if the message identifier is an unauthorized identifier. This may be determined by cross-referencing the message identifier to an identifier record of the wireless unit. The identifier record is a data entry, list, or other record associated with the wireless unit for purposes of screening/blocking messages.

12 Claims, 2 Drawing Sheets

(56) References Cited

U.S. PATENT DOCUMENTS

| | | | |
|---|---|---|---|
| 2001/0041579 A1* | 11/2001 | Smith et al. | 455/466 |
| 2003/0045309 A1* | 3/2003 | Knotts | 455/466 |
| 2003/0083078 A1* | 5/2003 | Allison et al. | 455/466 |
| 2003/0096600 A1* | 5/2003 | Lewis et al. | 455/412 |
| 2003/0153302 A1* | 8/2003 | Lewis et al. | 455/412 |
| 2004/0209604 A1* | 10/2004 | Urban et al. | 455/415 |
| 2004/0209605 A1* | 10/2004 | Urban et al. | 455/415 |
| 2004/0224706 A1* | 11/2004 | Lorello et al. | 455/466 |
| 2005/0101306 A1* | 5/2005 | Zabawskyj et al. | 455/414.1 |
| 2005/0122930 A1* | 6/2005 | Zhao et al. | 370/328 |
| 2005/0130629 A1* | 6/2005 | Kelkar et al. | 455/412.1 |
| 2005/0165965 A1* | 7/2005 | Henry et al. | 709/249 |
| 2005/0186974 A1* | 8/2005 | Cai | 455/466 |
| 2005/0216588 A1* | 9/2005 | Keohane et al. | 709/225 |
| 2005/0261009 A1* | 11/2005 | Hertzberg et al. | 455/466 |
| 2006/0079255 A1* | 4/2006 | Bantukul et al. | 455/466 |
| 2006/0148496 A1* | 7/2006 | Zhu | H04M 1/72552 455/466 |
| 2010/0281535 A1* | 11/2010 | Perry, Jr. | G06Q 10/107 726/22 |

\* cited by examiner

METHOD FOR BLOCKING SPAM SHORT MESSAGES IN WIRELESS NETWORK

This application is entitled to the benefit of and claims foreign priority under 35 U.S.C. §119 from Chinese Patent Application No. 200610077762.7, filed Apr. 21, 2006, the disclosure of which is hereby incorporated by reference.

FIELD OF THE INVENTION

The present invention relates to communications and, more particularly, to wireless communication systems.

BACKGROUND OF THE INVENTION

Many wireless communication networks (e.g., cellular networks) now include a short messaging service ("SMS"). The SMS allows users with properly configured wireless devices to send short alphanumeric messages ("text messages") to one another over the network. To send a text message, the message is keyed into the user's wireless device along with a communication identifier for contacting the recipient. The communication identifier may be the recipient's mobile phone number or, depending on the particular network and SMS system, it may be a messaging address or number, e.g., a streamlined number or address designated for text messaging. The network processes the text message for routing to the recipient. Message length is usually limited to 80-160 characters.

Generally speaking, since all that is required to send a text message is a valid recipient communication identifier, network users can send anonymous or non-solicited text messages to other users. For example, a user may be able to obtain communication identifiers from sources such as telephone directories, purchased mailing lists, or Internet harvesting. Accordingly, as with "spam" in the context of e-mail communications and unsolicited phone calls from telemarketers in the context of a public switched telephone network ("PSTN"), SMS users are subjected to receiving unwanted text messages. Besides being generally annoying in nature, such messages tie up a user's communication resources, e.g., wasted bandwidth and memory usage. Moreover, the recipient user has to take the time to read and delete the unsolicited or unwanted text messages.

SUMMARY OF THE INVENTION

An embodiment of the present invention relates to a method for communicating with a wireless unit over a network, e.g., for controlling the delivery of messages to the wireless unit. By "wireless unit," it is meant, for example, mobile phones, wireless PDA's, wireless devices with high-speed data transfer capabilities, such as those compliant with "3-G" or "4-G" standards, "WiFi"—equipped computer terminals, and the like. In a standard manner, a source terminal transmits a message to the wireless unit over a network messaging service, e.g., a short messaging service. (The source terminal may be another wireless unit, or some other device configured for communicating over the network.) According to the method, it is initially determined whether the message satisfies a message blocking criterion associated with the wireless unit, e.g., the blocking criterion is designated for use on or with the wireless unit. The message blocking criterion is a condition or rule (e.g., as established by a user of the wireless unit) used to automatically assess whether a message is to be blocked. If the message satisfies the criterion, the message is blocked.

In another embodiment, for determining whether the message satisfies the message blocking criterion, it is determined whether a message identifier is contained, listed, or otherwise referenced in an identifier record of the recipient wireless unit. The message identifier is a code or other identifier associated with the message being transmitted to the wireless unit that uniquely. identifies the message and/or the source of the message. For example, the message identifier may be the communication identifier of the source terminal that initiated transmission of the message to the recipient wireless unit. The identifier record is a data entry, list, or other record associated with the recipient wireless unit for purposes of screening/blocking messages. Based on the determination of whether the message identifier is referenced in the identifier record, the message may be blocked.

In another embodiment, the message is blocked unless the message identifier is referenced in an "authorized identifiers" portion of the identifier record. The authorized identifiers portion of the identifier record contains a list of the communication identifiers of one or more terminals that are authorized to send messages to the recipient user's wireless unit. If the communication identifier of a message is not referenced among the authorized identifiers, the message is blocked.

In another embodiment, the message is blocked if the message identifier is referenced in an "unauthorized identifiers" portion of the identifier record. The unauthorized identifiers portion of the identifier record contains a list of the communication identifiers of one or more terminals that are blocked from sending messages to the recipient user's wireless unit, e.g., they are not authorized to send messages to the wireless unit. If the communication identifier of a message is referenced among the unauthorized identifiers, the message is blocked. If not, the message is allowed for transmission or display.

In another embodiment, the message is blocked from being transmitted to the wireless unit. In such a case, the identifier record may be stored on a network switch component, with the method being carried out on the switch. By "switch," it is meant a network component that controls (either alone or in conjunction with other components) the transmission of messages to wireless units. For example, the switch may be a radio network controller, a mobile switching center, a base station, an SMS center, or the like.

In another embodiment, the message is received by the recipient wireless unit. However, the message is blocked from being displayed on the wireless unit if the communication identifier of the message (i) is listed in an unauthorized identifiers portion of an identifier record, or (ii) is not listed in an authorized identifiers portion of an identifier record. In such a case, the identifier record may be stored on the wireless unit, with the method being carried out on the wireless unit.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
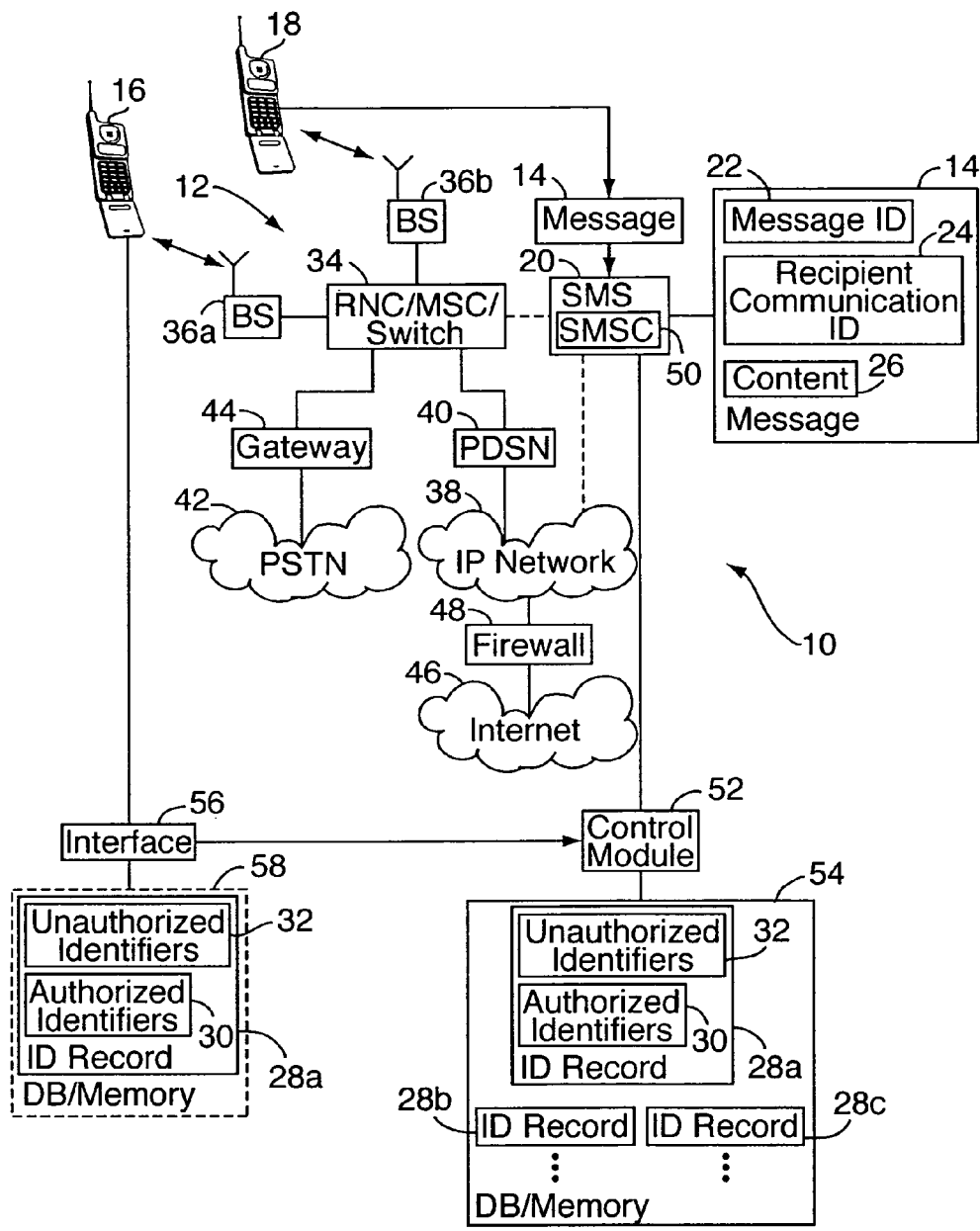
FIG. 1 is a schematic view of a system for controlling delivery of messages in a wireless network, according to various embodiments of the present invention.
Figure 2:
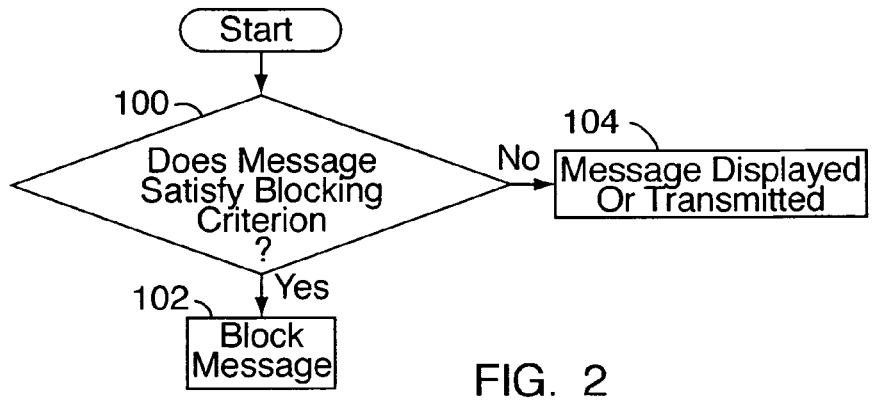
FIGS. 2 and 3 are flow charts showing operation of embodiments of the system shown in FIG. 1.
Figure 3:
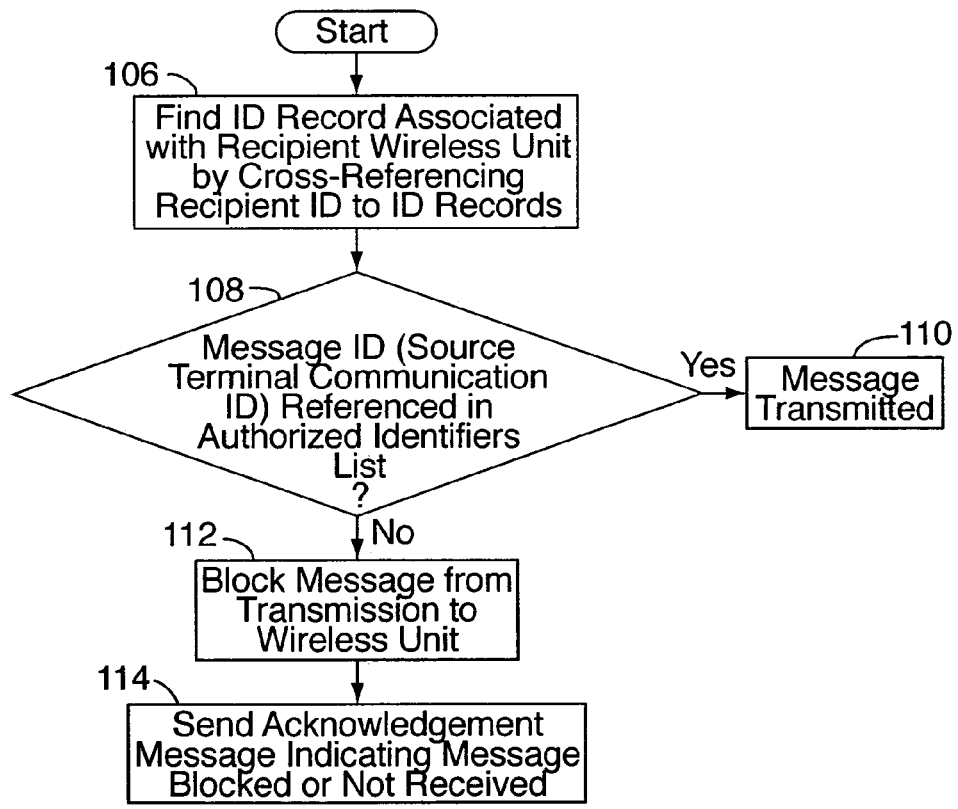

With reference to FIGS. 1-3, a system 10 is implemented on or as part of a wireless communication network 12 for controlling the delivery of messages 14 to recipient wireless units 16. A source terminal 18 transmits a message 14 to the wireless unit 16 over the network's messaging service ("SMS") 20. The message 14 includes a message identifier ("message ID") 22, a communication identifier ("communication ID") 24 of the recipient wireless unit 16, and message content data 26. Initially, it is determined whether the message 14 satisfies a message blocking criterion, or possibly more than one message blocking criterion. If so, the message is blocked. For example, the message ID 22 may be cross-referenced to an identifier record ("ID record") 28a of the wireless unit 16. The ID record 28a is a data entry, list, or other record associated with the wireless unit 16 for purposes of screening/blocking messages. If the message ID 22 is not referenced in an "authorized identifiers" portion 30 of the identifier record 28a, the message is blocked, either in terms of transmission to the wireless unit or display on the wireless unit. Alternatively, the message 14 may be blocked if the message ID 22 is referenced in an "unauthorized identifiers" portion 32 of the ID record 28a.

The system 10 of the present invention is suitable for implementation on various types of wireless networks. For example, the network 12 may be a CDMA-based 1x-EVDO communications network having a radio network controller ("RNC") and/or mobile switching center ("MSC") 34 connected to one or more fixed base stations ("BS") 36a, 36b. The base stations 36a, 36b each have a base station controller and various transceivers and antennae for radio communications with the wireless units 16. The wireless units 16 may include, for example, mobile phones, wireless PDA's, wireless devices with high-speed data transfer capabilities, such as those compliant with "3-G" or "4-G" standards, "WiFi"-equipped computer terminals, and the like. The RNC 34 interconnects the base stations and performs the signaling functions necessary to establish calls and other data transfer to and from the wireless units 16. It also acts as the interface between the wireless/radio end of the network 12 and the wire-line portion of the network. For example, the RNC 34 may be connected to an Internet protocol ("IP")—based network or other core packet data network 38, by way of a packet data serving node ("PDSN") 40. The RNC 34 may also be connected to a public switched telephone network ("PSTN") 42 through a PSTN gateway 44, which allows the wireless units 16 to access PSTN services such as originating and receiving PSTN calls, e.g., calls to public landline phones. The core data network 38 is used for the long distance wire-line transmission of packet data, and/or to interconnect the RNC 34 with other mobile switching centers and with additional network components such as a network AAA (authentication, authorization, and accounting) module, not shown. The network 12 may also be connected to a public packet data network 46 (e.g., the Internet) through a security firewall 48 or the like. For high-speed data transmission across the packet data networks 38, 46 (e.g., for facilitating web browsing, real time file transfer, or downloading large data files), the network 12 may use the Internet Protocol ("IP"), where data is broken into a plurality of addressed data packets. Additionally, VoIP (voice over IP) may be used for voice-data transmission. (With VoIP, analog audio signals are captured, digitized, and broken into packets like non-voice data.) Both voice and non-voice data packets are transmitted and routed over the wireless network 12, where they are received and reassembled by the wireless units 16 to which the data packets are addressed.

For carrying out radio frequency ("RF") communications, the wireless network 12 may use a CDMA (code division multiple access) spread-spectrum multiplexing scheme. Here, data and other signals are transmitted from the base stations 36a, 36b to the wireless units 16 across a first frequency bandwidth (e.g., a 1.25 MHz bandwidth centered at a first designated frequency) known as the forward link. Transmissions from the wireless units to the base stations are across a second frequency bandwidth (e.g., a 1.25 MHz bandwidth centered at a second designated frequency) known as the reverse link. Generally, each wireless unit is allocated the entire bandwidth all the time, with the signals from individual wireless units being differentiated from one another using an encoding scheme. The forward and reverse links may each comprise a number of physical or logical traffic channels and signaling/control channels, the former primarily for carrying voice data, and the latter primarily for carrying the control, synchronization, and other signals required for implementing CDMA or other communications. The wireless network may be geographically divided into contiguous cells, each serviced by a base station, and/or into sectors, which are portions of a cell typically serviced by different antennae/receivers supported on a single base station.

The messaging service 20 is a network service or component that allows wireless users to send non-voice messages to one another across the network 12. The messaging service 20 may be a short messaging service, an enhanced messaging service, a multimedia messaging service, or the like. In a short messaging service, users send short alphanumeric messages 14 ("text messages") to one another over the network 12, e.g., messages of typically no more than 80-160 ASCII or other alphanumeric characters, and without embedded formatting, images, or graphics. For a user to send a text message 14, the message is keyed into the user's wireless unit along with the communication identifier 24 of the recipient's wireless unit. The communication identifier 24 may be the recipient's wireless unit telephone number or, depending on the particular network/SMS system, it may be an address, number, or other identifier, e.g., a streamlined number or address designated for text messaging. Once a message is sent, it is received by a short message service center ("SMSC") 50. Depending on how the network is configured, the SMSC may be connected to the RNC 34, the core IP network 38, or elsewhere in the network 12. The SMSC 50 directs the message 14 to the appropriate recipient wireless unit 16. To do this, the SMSC sends an SMS request to the home location register ("HLR") of the RNC 34 (not shown) to find the roaming user. Once the HLR receives the request, it responds to the SMSC 50 with the recipient's status (e.g., inactive or active) and information as to where recipient is roaming, for directing the message to the appropriate base station for transmission. If the recipient's status is "inactive," then the SMSC will hold onto the message for a period of time. When the recipient accesses his wireless unit, the HLR sends an SMS notification to the SMSC, and the SMSC attempts delivery. For this, the SMSC transfers the message in a short message delivery point-to-point format to the RNC and/or base station. The recipient's wireless unit is paged or otherwise contacted, and if it responds the message is delivered. The SMSC receives verification that the message was received by the recipient, categorizes the message as "sent," and will not attempt to send again.

As noted, the messaging service 20 may also be an enhanced messaging service ("EMS"). EMS is an application-level extension to the SMS available on certain networks. An EMS-enabled wireless unit can send and receive messages that have special text formatting (such as bold or italic), animations, pictures, icons, sound effects, and special ring tones. EMS messages that are sent to devices that do not support the EMS format will be displayed as SMS transmissions, e.g., only alphanumeric characters will be displayed.

The messaging service 20 may also be a multimedia messaging service ("MMS"). MMS is a technology similar to EMS for transmitting not only text messages, but also various kinds of multimedia content (e.g., images, audio, and/or video clips) over wireless networks. In operation, the MMS data flow starts with a subscriber using an MMS client program on a wireless unit to compose, address, and send an MMS message to one or more recipients. The initial submission by an MMS client to the home MMS center ("MMSC") is accomplished using HTTP with specialized commands and encodings. Upon reception of the MMS message, the recipient MMSC sends a notification to the recipient's wireless unit using an SMS notification, HTTP push, or the like. Delivery can be either immediate or deferred. In the case of the former, the MMS client on the recipient wireless unit receives the MMS notification, and then immediately (without user intervention or knowledge) retrieves the MMS message from the MMSC that sent the notification. After retrieval, the subscriber is alerted to the presence of a newly arrived MMS message. With deferred delivery, the MMS client alerts the subscriber that an MMS message is available, and allows the subscriber to choose if and when to retrieve the MMS message.

The method and system 10 of the present invention may be implemented as a control module 52 in place on a network switch, e.g., at the RNC 34, SMS 20, base stations 16a, 16b, or elsewhere in the network where message or call routing functions are carried out. The control module 52 may be a script, computer program or suite of computer programs, hardware module, or a hardware/software module interfaced with the equipment and control functionality of the network component on which the control module is implemented. The control module 52 is configured to review or screen messages 14 being transmitted to users on the network, or at least messages transmitted to users who have subscribed to the service, and to potentially block messages based on one or more message blocking criterion. An example of this process is shown in FIGS. 1 and 2. At Step 100, when a source terminal 18 transmits a message 14 to a recipient wireless unit 16 over the network's SMS 20, the control module 52 determines whether the message 14 satisfies a message blocking criterion. For doing so, the control module 52 is configured to compare one or more components or portions of the message 14 to the blocking criterion. If the message satisfies the criterion, at Step 102 the message is blocked. The message blocking criterion is a condition or rule, established by the user of the recipient wireless unit, for assessing whether a message is to be blocked. If the message does not satisfy the blocking criterion, the message is transmitted or displayed as usual, as at Step 104.

For use in determining if a message 14 satisfies a blocking criterion, the control module 52 may have a memory unit and/or database ("DB") 54 containing a number of ID records 28a-28c. Each ID record 28a-28c is a data entry, list, or other record associated with a wireless unit 16 for purposes of screening/blocking messages. Typically, the ID records 28a-28c will contain blocking criterion as established or designated by the users of the wireless units with which the ID records are respectively associated. Each ID record 28a-28c also contains the communication identifier 24 of the wireless unit with which it is associated, or some other identifier that links the ID record to a wireless unit, wireless unit account, or user. To access the records 28a-28c, when a source terminal 18 transmits a message 14 the control module 52 cross-references the recipient communication ID 24 in the message (e.g., the communication identifier of the wireless unit to which the message is addressed) to the list of ID records 28a-28c.

The criterion for blocking a message 14 may be, for example, that (i) the message 14 is from an unauthorized source, or (ii) that the message 14 is not from an authorized source. As should be appreciated, in the case of the former all messages are allowed for display or transmission unless they are specifically deemed as being unauthorized. In the case of the latter, all messages are blocked unless they are specifically deemed as being authorized. If the blocking criterion relates to unauthorized or authorized messages, the ID record 28a for a wireless unit 16 may include an authorized identifiers list 30 or an unauthorized identifiers list 32. The authorized identifiers list 30 includes one or more wireless unit communication identifiers (e.g., phone numbers) that the user of the wireless unit 16 has specifically designated as being authorized for transmitting messages to the wireless unit 16. If the user desires to receive messages from certain source terminals 18, e.g., those used by family members, friends, coworkers, or business associates, the user accesses an interface module 56 on the wireless unit 16 to enter the communication identifiers of the authorized source terminals. The interface module 56 then communicates with the control module 52 for entering the authorized communication identifiers into the ID record 28a for the wireless unit 16. The interface module 56 will typically be a script or computer program integrated with the wireless unit's existing electronic menu system for carrying out the functions of reviewing, editing, adding, and removing communication identifiers from the ID record 28a.

An example of the process for determining if a message 14 satisfies the message blocking criteria of not being from an authorized source (e.g., in the case where the ID records 28a-28c each contain an "authorized identifiers" list 30) is shown in FIG. 3. Initially, a source terminal 18 transmits a message 14. The message contains a message ID 22 (e.g., the communication identifier of the source terminal 18), the communication ID 24 of the recipient wireless unit 16, and message content 26. (As should be appreciated, the message ID 22 and recipient communication ID 24 may be contained in separate signaling portions of the message or even in separate signaling channels apart from the message content. For illustration purposes, these elements are treated herein as being contained in a unified message structure.) At Step 106, the control module 52 cross-references the recipient communication ID 24 in the message 14 to the ID records 28a-28c, to find the ID record 28a associated with the recipient wireless unit 16. At Step 108, the control module 52 determines if the message ID 22 is contained, listed, or otherwise referenced in the authorized identifiers list 30 in the ID record 28. If so, at Step 110 transmission of the message 14 continues as normal. If not, at Step 112 transmission of the message 14 is blocked. Optionally, if the message is blocked, the control module 52 may initiate transmission of an acknowledgement message to the source terminal 18, indicating that the message was blocked and/or not received, as at Step 114.

If the blocking criterion relates to unauthorized messages, the ID record 28a for a wireless unit 16 will include an unauthorized identifiers list 32. The unauthorized identifiers list 32 includes one or more wireless unit communication identifiers (e.g., phone numbers) that are designated as not being allowed to transmit messages to the wireless unit 16. If the user desires not to receive messages from certain source terminals 18, e.g., those used by advertisers, the user accesses the interface module 56 on the wireless unit to enter the communication identifiers of the unauthorized source terminals. The interface module 56 then communicates with the control module 52 for entering the unauthorized communication identifiers into the ID record 28a for the wireless unit 16. Here, as is also the case with authorized communication identifiers, the interface module 56 may include a streamlined function for enabling users to designate authorized or unauthorized identifiers but without having to enter the identifiers manually. For example, the interface module 56 may include a "block" function or a "friends" function accessible from where a message is displayed. Thus, when a message is received, upon viewing the message the user may select "block," with the control module 52 automatically adding the message ID 22 of that message to the unauthorized identifiers list 32 of the ID record 28a. Alternatively, the user may select "friends" to have the control module 52 add the message ID 22 of that message to the authorized identifiers list 30 of the ID record 28a.

Determining if a message is referenced in an unauthorized list 32 is similar to the case of the authorized list 30. After finding the ID record 28a associated with the recipient wireless unit 16, the control module 52 determines if the message ID 22 is contained, listed, or otherwise referenced in the unauthorized identifiers list 32 in the ID record 28. If not, transmission of the message 14 continues as normal. If so, transmission of the message 14 is blocked.

As indicated in FIG. 1, the method and system 10 of the present invention may be implemented entirely on a wireless unit 16. Here, the interface module 56 would include a memory unit and/or database 58 containing the ID record 28a of the wireless unit. Upon the wireless unit 16 receiving a message, but prior to the message being displayed, the interface module 56 would determine if the message satisfies the blocking criterion or criteria. If so, the message would not be displayed on the wireless unit. If not, display of the message (or alerting the user that a message is available for display) would commence as normal. Blocked messages could be saved in a "blocked" or "junk" directory for the user to optionally access and review.

The message blocking criteria may be based on factors other than whether the source terminal 18 is designated as being authorized or unauthorized to send messages to a wireless unit 16. For example, the criteria may relate to message content, such as screening for adult content, advertising text, or other key words. Also, multiple message blocking criteria may be used, and messages satisfying certain criteria but not others could be treated in different manners, as designated by the user or otherwise. For example, a wireless unit could have both an unauthorized identifiers list and an authorized identifiers list. Unauthorized messages would be blocked. Authorized messages would be displayed/transmitted immediately. Messages satisfying neither criterion, e.g., messages form sources not specifically unauthorized but also not explicitly authorized, could be stored in a secondary or non-priority file for eventual review by the recipient user if desired.

Since certain changes may be made in the above-described method for controlling delivery of short messages in a wireless network, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A method for communicating with at least one wireless unit over a network, the method comprising:
    determining if a message satisfies at least one message blocking criterion associated with the at least one wireless unit, wherein the message is configured for transmission to the at least one wireless unit over a wireless network messaging service, by referencing a message identifier of the message to an identifier record for the at least one wireless unit, wherein the at least one message blocking criterion comprises the message identifier not being listed in an authorized identifiers portion of the identifier record; and, when so,
    blocking the message from at least one of transmission to the at least one wireless unit and display on the at least one wireless unit; and
    transmitting an acknowledgement to at least one of a switch portion of the network in communication with the at least one wireless unit and a terminal originating the message, wherein the acknowledgement indicates that the message was blocked and/or not received.

2. The method of claim 1 wherein:
    the identifier record is stored on the switch portion of the network; and
    the method is carried out at the switch portion.

3. The method of claim 1, wherein the message is blocked from transmission to the at least one wireless unit when the message identifier is referenced in an unauthorized identifiers portion of the identifier record, and wherein the message is blocked from display on the wireless unit unless the message identifier is referenced in the authorized identifiers portion.

4. The method of claim 3 wherein:
    the identifier record is stored on the switch portion of the network; and
    the method is carried out at the switch portion.

5. The method of claim 1, wherein:
    the message is blocked from display on the at least one wireless unit unless the message identifier is referenced in the authorized identifiers portion of the identifier record.

6. The method of claim 5 wherein:
    the identifier record is stored on the at least one wireless unit; and
    the method is carried out at the at least one wireless unit.

7. The method of claim 1, wherein:
    the message is a short text message;
    the messaging service is a short messaging service; and
    the at least one wireless unit is a mobile phone.

8. The method of claim 1, wherein:
    the identifier record is stored in a database in the switch portion of the network;
    the message includes a communication identifier of the at least one wireless unit; and
    the method further comprises accessing the identifier record by cross-referencing the communication identifier to the database, the communication identifier being associated with the identifier record in the database.

9. A method for controlling delivery of messages to a wireless unit, the method comprising:
    referencing a message identifier to an identifier record of the wireless unit, wherein the message identifier is associated with a message configured for transmission to the wireless unit over a wireless network messaging service, and wherein the identifier record includes an authorized identifiers portion and an unauthorized identifiers portion; and
    determining whether to block the message based on the message identifier as referenced to the identifier record, wherein the message is blocked from transmission to the wireless unit when the message identifier is referenced in the unauthorized identifiers portion and the message is blocked from display on the wireless unit unless the message identifier is referenced in the authorized identifiers portion; and, when so, transmitting an acknowledgement to at least one of a network switch in communication with the at least one wireless unit and a terminal originating the message, wherein the acknowledgement indicates that the message was blocked and/or not received.

10. A method for communicating with at least one wireless unit over a network, the method comprising:

accessing an identifier record in a database based on a communication identifier, wherein the communication identifier is associated with the identifier record in the database and with the at least one wireless unit, the communication identifier being received in a message configured for transmission to the at least one wireless unit over a wireless network messaging service;

blocking the message from at least one of being transmitted to the at least one wireless unit and display on the at least one wireless unit based on a comparison of the identifier record and a message identifier associated with the message, wherein the message is blocked unless the message identifier is referenced in an authorized identifiers portion of the identifier record; and transmitting an acknowledgement to at least one of a network switch in communication with the at least one wireless unit and a terminal originating the message, wherein the acknowledgement indicates that the message was blocked and/or not received.

11. The method of claim 10 wherein:
the message is a short text message;
the messaging service is a short messaging service; and
the at least one wireless unit is a mobile phone.

12. The method of claim 11, wherein:
the message is blocked from being transmitted to the at least one wireless unit when the message identifier is referenced in an unauthorized identifiers portion of the identifier record and the message is blocked from display on the at least one wireless unit unless the message identifier is referenced in the authorized identifiers portion.

* * * * *